United States Patent [19]

Adamski

[11] Patent Number: 4,785,494
[45] Date of Patent: Nov. 22, 1988

[54] TRAILER DOORPOST AND TRACK ASSEMBLY

[75] Inventor: Gregory J. Adamski, Edison, N.J.

[73] Assignee: Reliable Trailer and Body, Inc., Florence, N.J.

[21] Appl. No.: 36,531

[22] Filed: Apr. 9, 1987

[51] Int. Cl.$^4$ .................. F06B 9/08; E05D 15/38; B60J 5/06
[52] U.S. Cl. .................. 16/95 R; 16/96 R; 160/133; 49/198; 296/155
[58] Field of Search .......... 16/95 R, 95 W, 95 D, 16/95 DN, 94 R, 87.4 R, 87.6 R, 96 R; 104/106, 107, 109, 94, 89; 105/378; 384/55, 58; 160/201, 133, 207; 49/197, 198, 199, 200, 365; 296/155, 183, 3

[56] References Cited

U.S. PATENT DOCUMENTS

| | | | |
|---|---|---|---|
| 2,022,917 | 12/1935 | Larkin | 49/365 |
| 2,275,730 | 3/1942 | Casse | 49/365 |
| 2,675,276 | 4/1954 | Daugherty | 49/365 |
| 2,835,539 | 5/1958 | Conrad | 49/365 |
| 3,054,645 | 9/1962 | Evans | 49/365 |
| 3,813,132 | 5/1974 | Sahm | 49/365 |
| 3,885,837 | 5/1975 | Mellor | 49/365 |

Primary Examiner—Nicholas P. Godici
Assistant Examiner—Edward A. Brown
Attorney, Agent, or Firm—Sughrue, Mion, Zinn, Macpeak & Seas

[57] ABSTRACT

Trailer doorposts are provided with removable tracks for rollers of vertically sliding doors. The tracks are provided with removable plastic inserts upon which the rollers travel. Weather stripping on the inside faces of the outer end wall of the tracks provide a seal between the doors slidable in the tracks.

10 Claims, 4 Drawing Sheets

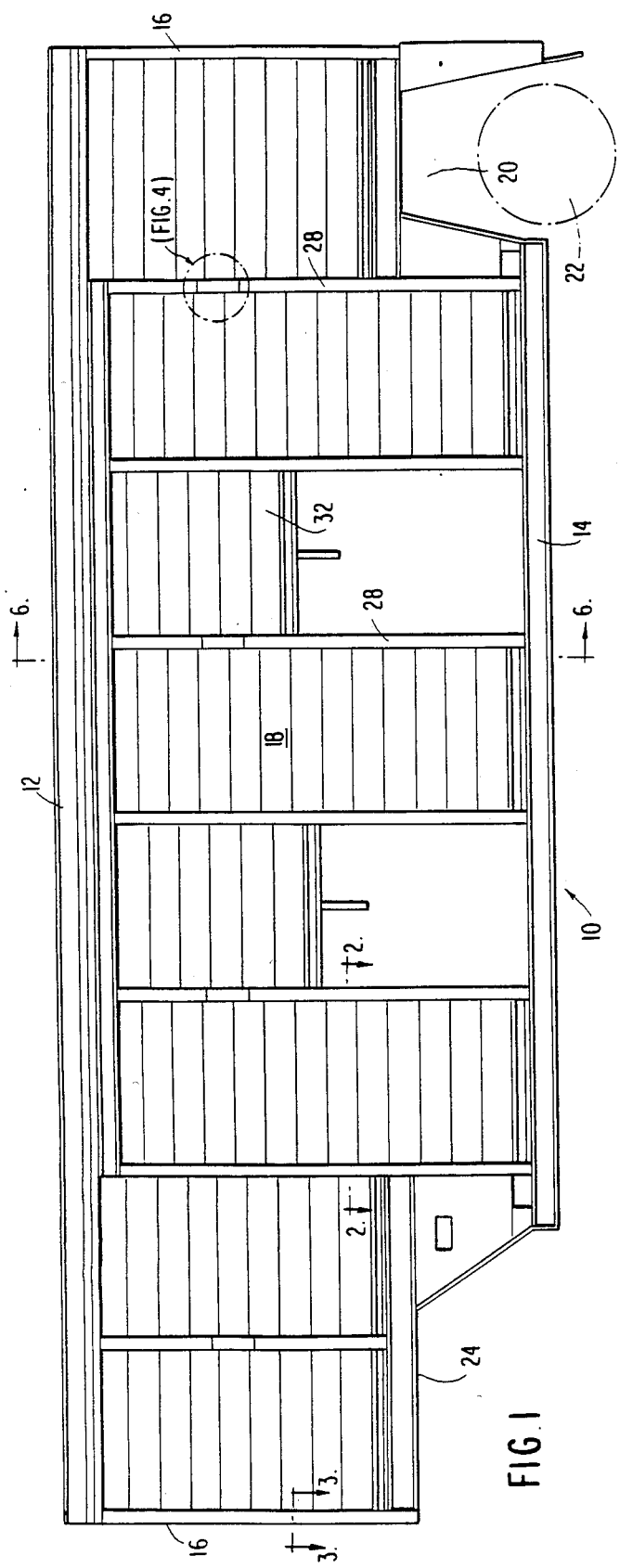
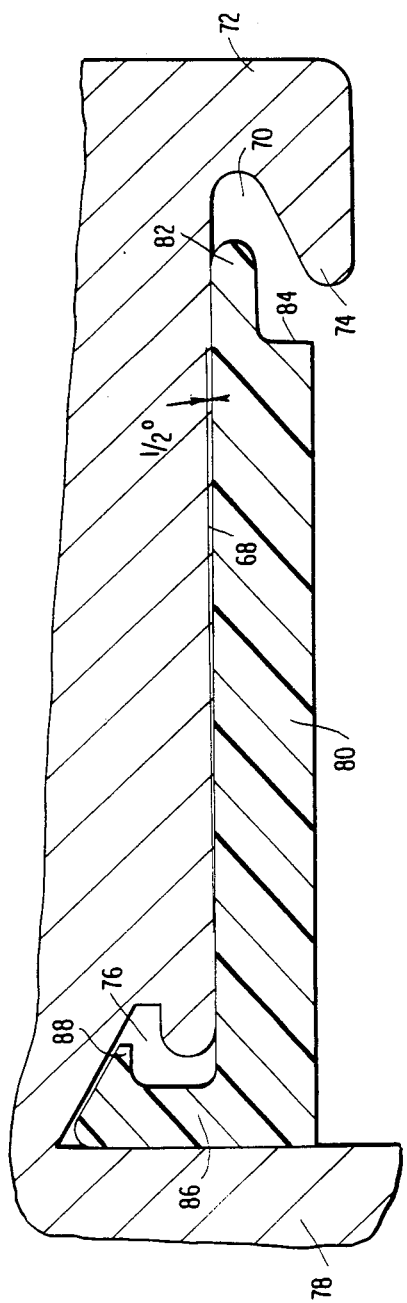
FIG. 1
FIG. 5

TRAILER DOORPOST AND TRACK ASSEMBLY

BACKGROUND OF THE INVENTION

1. Field of the Invention

This invention pertains to door and track assemblies for cargo-carrying trailers of the type having vertically slidable side access doors.

2. Background of the Prior Art

The prior art shows tracks or guideways for slidable members which ride on various types of bearing surfaces. The difficulty with tracks for vertically sliding doors is that the tracks do not provide durable long lasting smooth surfaces for door rollers. Rather, the prior art tracks for such doors were inadequate in that they caused early wear on door rollers such that the doors needed to be removed and rollers replaced. This was time consuming and expensive and caused considerable downtime in the use of such trailers. Representative of the prior art patents showing tracks for slidable devices are listed below. Copies are furnished for the record.

| Inventor | Patent No. |
| --- | --- |
| E. T. Larkin | 2,022,917 |
| J. Daugherty | 2,675,276 |
| W. B. Conrad | 2,835,539 |
| J. C. Evans | 3,054,645 |
| Sahm | 3,813,132 |
| Mellor | 3,885,837 |

SUMMARY OF THE INVENTION

There is a need for a lightweight doorpost and track assembly which is simple to manufacture yet easy to install in cargo-carrying trailers.

It is therefore an object of this invention to provide an extruded lightweight aluminum doorpost and track assembly which is easy to install in cargo-carrying trailers.

It is another object of this invention to provide a unique removable door track having a removable bearing surface for door rollers which eliminates door track and door roller wear normally inherent in such systems.

It is still another object of this invention to provide a smooth surface track for door rollers that protects the rollers from excessive wear thus extending the useful life of said door rollers.

And yet another object of this invention is to provide an extruded aluminum door track having beveled channels for receiving removable nylon inserts which function as smooth bearing surfaces for door rollers.

These and other objects of the invention will become apparent to those skilled in the art to which the invention pertains from a reading of the following specification when taken in light of the annexed drawings.

BRIEF DESCRIPTION OF THE DRAWINGS

FIG. 1 is a side elevational view of a cargo-carrying carrier having vertically sliding doors therein.

FIG. 5 is an enlarged cross-sectional view of a removable nylon insert for the door track as seen in FIG. 2.

DETAILED DESCRIPTION OF THE PREFERRED EMBODIMENT OF THE INVENTION

Figure 2:
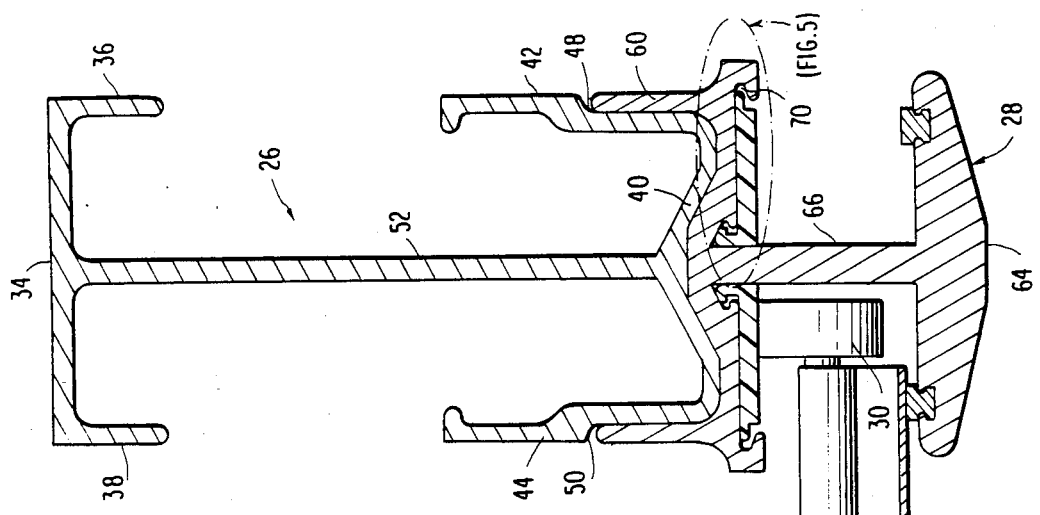
FIG. 2 is a cross-sectional top view of a trailer door and track assembly taken along the line 2—2 of FIG. 1.
Figure 2:
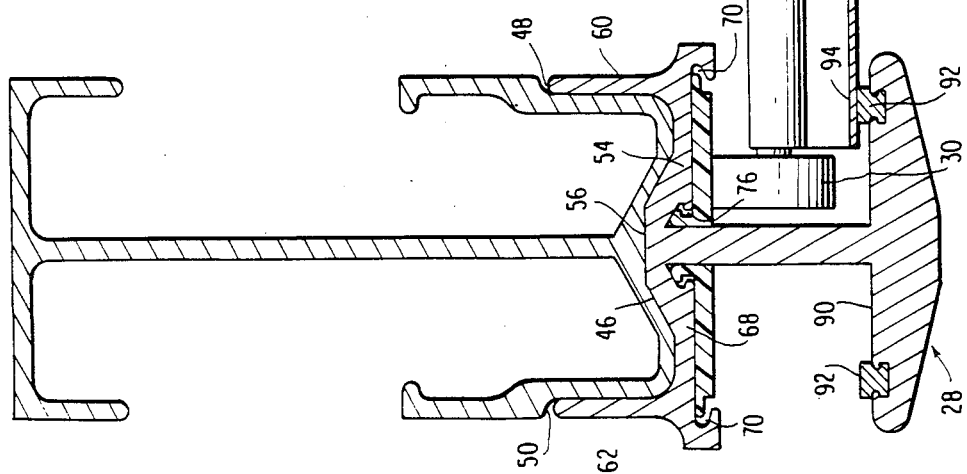

Referring to the drawings in more detail, FIG. 1 shows a trailer 10 having a roof 12, a bottom wall 14, end walls 16, identical sidewalls 18, wheel wells 20 for wheels 22 and a fifth wheel section 24 whereby the trailer is attached to a tractor.

The sidewalls 18 (since they are identical, only one will be described in detail) comprise a plurality of horizontally spaced vertical doorposts 26, FIGS. 2 and 4, having removable door tracks 28 which receive the rollers 30 of vertically slidable doors 32. The doorposts 26 are aluminum extrusions having an inner end wall 34 with side flanges 36 and 38 and an outer end wall 40 having side flanges 42 and 44. The wall 40 has a generally V-shaped face 46 extending vertically the length of the post and the side flanges 42 and 44 have indented wall portions 48 and 50. A web portion 52 connects the end walls 34 and 40 to form an integral unitary post 26. The track 28, FIGS. 2 and 5, comprises an inner end wall 54 having an outer face 56 which is generally V-shaped and is received in the V-shaped face 46 of the post 26. Side flanges 60 and 62 extend from inner wall 54 and abut the flanges 42 and 44 within the indented wall portions 48 and 50. Each of the tracks 28 has an outer end wall 64 which is generally T-shaped and includes a connecting flange 66 to form with inner end wall 54 an integral unitary track 28 formed of extruded aluminum, steel, durable plastic or other suitable material. The innerface 68 of inner wall 54 has a slot 70 (FIGS. 2 and 5) in each end 72 having a forward projection 74 thereon. A raceway 76 is provided in the track 28 adjacent the junction of inner wall 54 and the inner portion 78 of the connecting flange 66. A plastic insert 80 has a rounded end projection 82 thereon and a recess portion 84 therein at one end and a flange portion 86 having a projection 88 is on the other end, thereby permitting the insert 80 to be removably received in the slot 70 and raceway 76 whereby the insert 80 abuts the inside face 68 of the track 28. In this regard, it will be appreciated that the projection 82 is snugly received in the slot 70 with the projection 74 being received in the recess 84. The flange 86 and projection 88 are likwise received in the raceway 76 providing a snug fit for the removable insert 80 against the inside wall 68 of the track 28. This construction permits easy removal and replacement of the plastic insert 80 in the event that it becomes worn. The plastic insert 80 may be nylon or other suitable durable plastic material which provides a smooth bearing surface for the rollers 30. The outer wall 64 has inner faces 90 having weather stripping 92 therein against which the ends 94 of the doors 32 abut to provide a tight weather seal.

Figure 4:
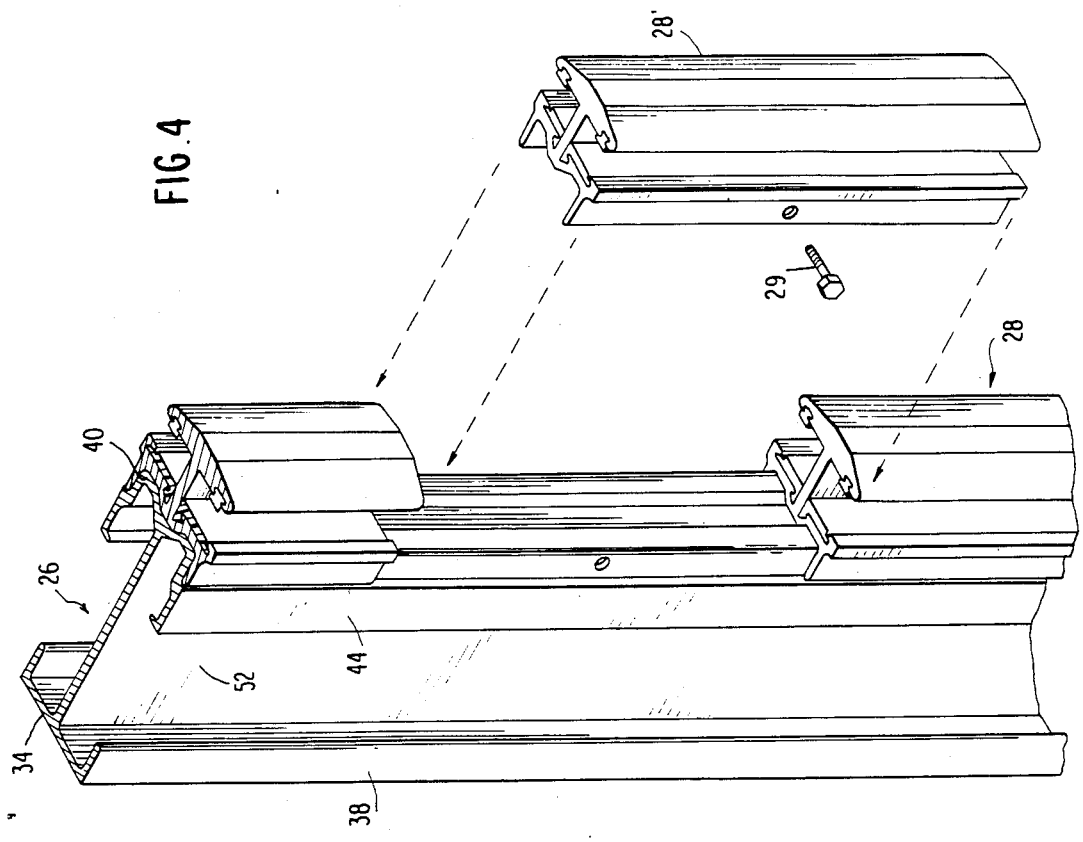
FIG. 4 is an exploded perspective view of one of the doorposts and track assemblies taken at the indicated area of FIG. 1.

As shown in FIGS. 1 and 4, every other track 28 is provided with a removable section 28' which is fastened to the flange 44 of post 26 by a screw or bolt 29. The removable section 28' permits removal of the doors 32 whereby worn inserts 80 may be removed and replaced with new inserts. This assembly and construction greatly extend the useful life of door rollers inasmuch as the inserts provide durable smooth surfaces thus preventing excessive wear on the rollers.

Figure 3:
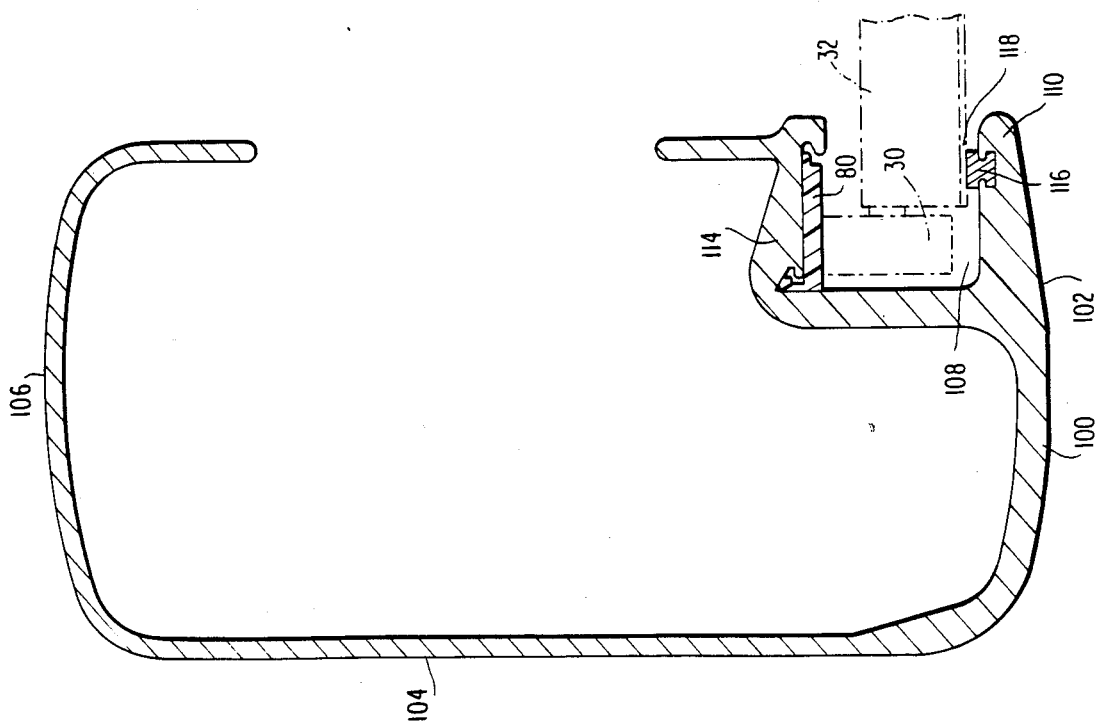
FIG. 3 is a cross-sectional top view of a trailer door corner post and track assembly taken along the lines 3—3 of FIG. 1.

Each of the end or corner posts 100 (one shown in FIG. 3) has a sidewall 102, end wall 104, an inner wall 106 and a channel 108 formed by an outer projection 110, having weather stripping 116 therein, and by an opposed inner projection 114 having an inner construction identical to the track 28 for receiving a removable plastic insert insert 80 upon which travel the rollers 30. As will be appreciated, the weather stripping 116 seals the end 118 of the door 32.

Figure 6:
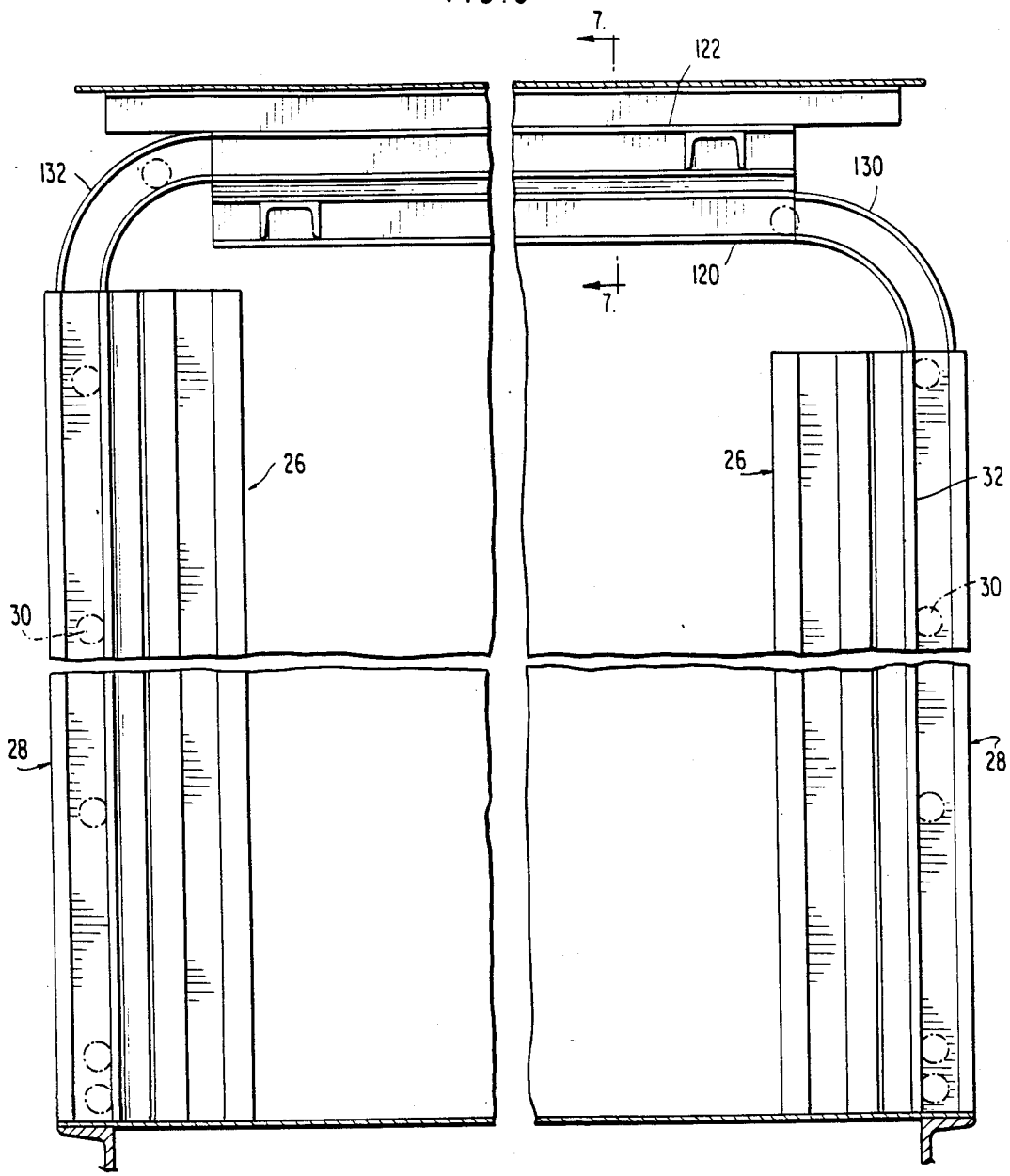
FIG. 6 is a cross-sectoional view of the trailer taken along the line 6—6 of FIG. 1.
Figure 7:
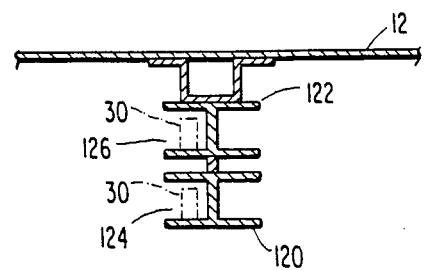
FIG. 7 is a sectional view of the overhead track assembly taken along the line 7—7 of FIG. 6.

FIGS. 6 and 7 show doorposts 26, together with the associated tracks 28, for both sides of the trailer and further show the door rollers 30 therein. The doorpost 26 and tracks 28 have upper extensions 120 and 122 having respective channels 124 and 126 for receiving the doors 32 and associated rollers 30. Curved connecting track members 130 for the right side track 28 and 132 for the left side track 28 provide a smooth transition for doors and rollers as they are slid upwardly into the tracks 120 and 122 during unloading of beverage containers. The track assemblies 120 and 122 are suitably secured to the roof 12 of the trailer by any suitable means.

While the invention has been described with regard to a preferred embodiment thereof, it will be appreciated to those skilled in the art that numerous changes may be made in the construction of the post and track assembly without departing from the spirit and scope of the invention.

What is claimed is:

1. A trailer doorpost and track assembly comprising:
a doorpost having an outer end wall;
a track member having an inner end wall, an outer end wall and a web portion integral with said walls;
said inner end wall of said track member having side flanges forming a U-shaped channel telescoped onto said doorpost; and
a removable bearing insert for said track member and upon which travel rollers of a door slidable in said track member.

2. A trailer doorpost and track assembly comprising:
a doorpost having an outer end wall;
said outer end wall having opposed side flanges;
a track member having an inner end wall, and outer end wall and a web portion integral with said walls;
said outer end wall of said track member having opposed side flanges forming a U-shaped channel portion for connection to said side flanges of said outer wall of said doorpost; and
a removable bearing insert for said track member and upon which travel rollers of a door slidable in said track member.

3. A trailer doorpost and track assembly comprising:
a doorpost having an inner end wall, and outer end wall and a web portion integral with said walls;
a track member having an inner end wall, an outer end wall and a web portion joining said walls;
means for connecting said track member to said doorpost; and
a removable insert for said track member and upon which travel rollers of a door slidable in said track member;
wherein said outer end wall of said doorpost has a channeled face portion and side flanges have indented wall portions; and said inner end wall of said track member has raised outer face portions, fitted into said channeled face portion of said outer end wall of said doorpost, and side flanges, received in said indented wall portions of said side flanges of said outer end wall of said doorpost, whereby said doorpost and said track member are interfitted together.

4. A trailer doorpost and track assembly comprising:
a doorpost having an inner end wall, and outer end wall and a web portion integral with said walls;
a track member having an inner end wall, an outer end wall and a web portion joining said walls;
means for connecting said track member to said doorpost; and
a removable insert for said track member and upon which travel rollers of a door slidable in said track member;
wherein said inner end wall of said track member has an inner face having a slot at one end and a raceway at the opposite end for receiving means for removably attaching said insert in said track member.

5. A trailer doorpost and track assembly according to claim 5, wherein said means comprises:
a projection and recess on one side of said insert for cooperating with said slot and a projection on said inner end wall of said track member; and
a flange and projection on the other opposite side of said insert and cooperating with said raceway.

6. A trailer doorpost and track assembly comprising:
a doorpost having an inner end wall, and outer end wall and a web portion integral with said walls;
a track member having an inner end wall, an outer end wall and a web portion joining said walls;
means for connecting said track member to said doorpost; and
a removable insert for said track member and upon which travel rollers of a door slidable in said track member;
wherein said outer end wall of said track member has an inner face having weather stripping therein for providing a seal between said outer end wall of said track member and a door slidable in said track member.

7. A trailer doorpost and track assembly comprising:
a doorpost having an inner end wall, and outer end wall and a web portion integral with said walls;
a track member having an inner end wall, an outer end wall and a web portion joining said walls;
means for connecting said track member to said doorpost; and
a removable insert for said track member and upon which travel rollers of a door slidable in said track member;
said track member having a removable section facilitating installing and removing of a door slidable in said track member.

8. A trailer doorpost and track assembly comprising:
a doorpost having an inner end wall (114) and an outer end wall (110);
said inner end wall having an outer face defining a track member; and
a removable insert for said track member and upon which travel rollers of a door slidable in said track member; said outer face having a slot at one end and a raceway at the opposite end for receiving means for removably attaching said insert in said track member.

9. A trailer doorpost and track assembly according to claim 8, wherein said means comprises:
 a projection and recess on one side of said insert for cooperating with said slot and a projection on said outer face; and
 a flange and projection on the other side of said insert and cooperating with said raceway.

10. A trailer doorpost and track assembly according to claim 9, wherein an inner face of said outer end wall has weatherstripping therein for providing a seal between said outer end wall and a door slidable in said track member.

* * * * *